Oct. 25, 1949.  T. J. ADAMS  2,486,237
WINE BUNG
Filed April 28, 1947
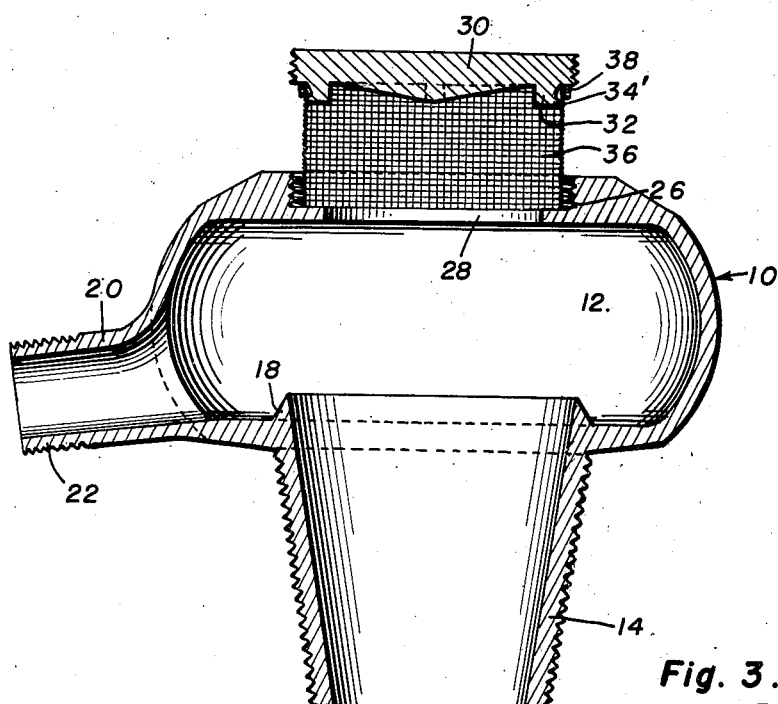
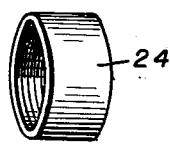
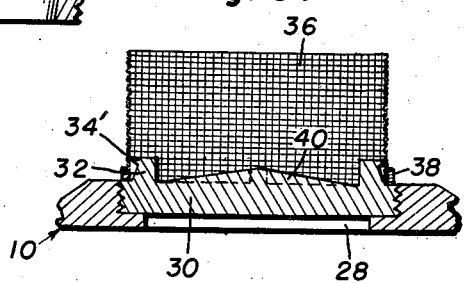
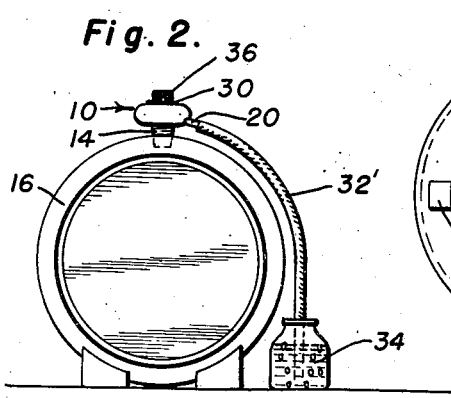
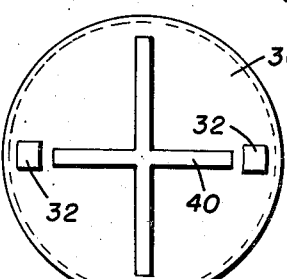
Inventor
Thomas J. Adams
By Clarence A. O'Brien
and Harvey B. Jacobson
Attorneys Patented Oct. 25, 1949

2,486,237

UNITED STATES PATENT OFFICE 2,486,237

WINE BUNG

Thomas J. Adams, Manitowoc, Wis.

Application April 28, 1947, Serial No. 744,286

4 Claims. (Cl. 217—98)

This invention relates to new and useful improvements in wine bungs and the primary object of the present invention is to provide a wine bung adapted to facilitate home wine making by a more economical sanitary method than heretofore generally used.

In making wine the grapes are usually crushed and the whole allowed to ferment for several days after which the juice is squeezed from the pulp and put into a barrel to continue fermentation, for a longer period. It has been customary to allow the fermenting wine to slop over the bung thereby carrying off sediment, pieces of pulp and other undesirable foreign matter necessary for producing the wine.

The present bung serves to skim and carry off the sediment, pieces of pulp and skins which remain in the juice after the crushing process and during the fermentation. However, it is decidedly important to save the wine which carries off this undesirable foreign matter and return the same periodically to the wine barrel after sieving out the undesirable foreign matter. In this respect, the bung serves its best purpose, that of improving the old method wherein an appreciable amount of wine was lost.

A further purpose of the present invention is to provide a wine bung designed to retard the escape of the alcohol content within the barrel and thereby increase the effectiveness of fermentation of the wine within the barrel.

A still further aim of the present invention is to provide a device of the character referred to that is simple and practical in construction, reliable and effective in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a longitudinal vertical sectional view taken through the center of the bung, showing the screen in use;

Figure 2 is a view in elevation showing the device in use;

Figure 3 is a fragmentary view in vertical transverse section of the upper end of the bung showing the screen in an unused position;

Figure 4 is a perspective view of the cap for closing the waste pipe of the bung; and, Figure 5 is a plan view of the cap.

Referring now to the drawings in detail, wherein for the purpose of illustration, there is shown a preferred embodiment of the present invention, the numeral 10 represents generally the wine bung comprising a hollow body 12 having an externally threaded tapering sleeve or nipple 14 depending from its lower central portion that engages the usual opening provided in a barrel 16.

An annular inclined rim 18 at the inner edge of said sleeve provides the skimming means for the fluid fermenting in the bung.

Projecting outwardly from one side of the bung is a downwardly inclined outlet pipe 20 which discharges waste from the bung. The terminal portion of the pipe 20 is threaded as at 22 to receive an internally threaded cap 24 for closing the pipe.

At the upper end of body 12 is provided an internally threaded annular recessed portion 26 having an air vent 28 that communicates with the hollow body 12.

An externally threaded vent closing cap 30 is fitted in said recess and circumferentially spaced lugs 32 projecting outwardly from said cap are provided with lips 34' for frictionally engaging one edge of a cylindrical screen 36. A clamping band 38 carried by the screen aiding in retaining the screen in position to the lugs between lips 34' and the cap.

During the fermentation period the cap is removed from the recess 26 and inverted so that the screen is frictionally retained in the recessed portion, as more clearly shown in Figure 1 of the drawings. In this position air may enter through the vent 28 into the barrel.

After the wine has stopped violent fermentation but is still partially active, it has been customary to cork up or close the bung with various means that would allow the escape of such gases as carbon dioxide that are still being produced. During this process the cap 30 is secured in the recess 26 as shown in Figure 3. A flexible tube 32' connected to pipe 20 is extended into a receptacle 34 holding water and constituting a liquid seal which allows gas to escape without permitting air to enter the barrel which may cause the wine to sour, see Figure 2.

Integrally formed with the cap 30 or added as a separate part thereto are radial substantially convex fins 40. These fins tend to converge to the center of the cap, any liquid such as droplets or condensation that may gather on the cap during fermentation of the wine and when the screen portion by the cap is fixed in the portion 26. It has further been found that these fins serve to impart a cooling effect by such a retention of the liquid in the form of droplets that tend to evaporate quickly.

Upon complete fermentation of the wine in the barrel, the cap 30 is secured in the recess 26 and cap 24 is applied to the outlet pipe 20 so that the barrel may be moved without spilling the contents therein.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A bung comprising a hollow body, an attaching sleeve depending from the body, outlet means carried by the body, said body having a recess in its upper portion and an air vent in the recess communicating with the body, a cylindrical, open-ended screen, a closure cap, and means removably securing the closure cap to one end of the screen, said closure cap and the free end of said screen being selectively engageable in the recess for closing or screening the vent.

2. The combination of claim 1 wherein said means includes a plurality of circumferentially spaced lugs carried by said closure cap, and a resilient band embracing said screen and yieldingly retaining one end of said screen against said lugs.

3. The combination of claim 2 wherein said lugs are provided with lips for engaging one end of the screen.

4. The combination of claim 1 wherein one face of said closure cap is provided with a plurality of radially disposed, wedge-shaped ribs for receiving condensation forming on said cap from a liquid in the container on which the bung is applied.

THOMAS J. ADAMS.

REFERENCES CITED

The following references are of record in the file of this patent:

UNITED STATES PATENTS

| Number | Name | Date |
|---|---|---|
| 515,095 | Schaefer | Feb. 20, 1894 |
| 1,065,925 | Dosch | July 1, 1913 |
| 1,813,964 | Schubert | July 14, 1931 |

FOREIGN PATENTS

| Number | Country | Date |
|---|---|---|
| 9,585 | Great Britain | Apr. 22, 1909 |
| 251,665 | Germany | Nov. 5, 1911 |